(12) United States Patent  (10) Patent No.: US 6,535,696 B1
Chan  (45) Date of Patent: Mar. 18, 2003

(54) FILM PRE-EXPOSED APPARATUS AND METHOD

(76) Inventor: Yet Chan, 12/F., Union Hing Yip Factory Building, 20 Hing Yip Street, Kwun Tong, Kowloon, Hong Kong (HK)

( * ) Notice: Subject to any disclaimer, the term of this patent is extended or adjusted under 35 U.S.C. 154(b) by 0 days.

(21) Appl. No.: 09/495,320

(22) Filed: Jan. 31, 2000

(51) Int. Cl.[7] .................. G03B 41/00; G03B 17/24; G03B 17/26
(52) U.S. Cl. ................ 396/322; 396/512; 396/513; 355/20; 355/40
(58) Field of Search .................. 396/6, 322, 335, 396/337, 310, 315, 316, 317, 318, 512, 513; 355/20, 40

(56) References Cited

U.S. PATENT DOCUMENTS

| | | | |
|---|---|---|---|
| 5,187,512 A | | 2/1993 | Kirkendall |
| 5,311,231 A | * | 5/1994 | Suzuki et al. .................. 396/6 |
| 5,546,146 A | * | 8/1996 | Dobbs et al. ................ 396/322 |
| 5,625,431 A | | 4/1997 | Kogane et al. |
| 5,765,062 A | | 6/1998 | Dobbs et al. |
| 5,794,087 A | | 8/1998 | Dobbs et al. |
| 5,873,002 A | * | 2/1999 | Glanville, Sr. et al. ......... 396/6 |
| 5,984,535 A | | 11/1999 | Fukuda et al. |
| 6,208,814 B1 | * | 3/2001 | Haishi ........................ 396/332 |
| 6,223,002 B1 | * | 4/2001 | Chan ........................... 396/322 |
| 6,233,401 B1 | * | 5/2001 | Leung ........................... 396/6 |

* cited by examiner

*Primary Examiner*—Alan A. Mathews
(74) *Attorney, Agent, or Firm*—Samuels, Gauthier & Stevens

(57) ABSTRACT

A method of pre-exposing photographic film with latent images comprises the steps of: providing a film container (18) having a housing defining a film slot therein and a film-winding tool (46) opening; providing a roll of unexposed film; securing a leading end of the film to a film-winding tool (46) arranged on the opposite side of an exposure opening from said roll of unexposed film and enclosing the film leading end and winding tool end (46) in the container (18) with the tool extending from the film-winding tool opening; enclosing the film container and roll of film in a light-tight enclosure (12, 14); sequentially exposing the film to a series of images directed onto the film, and advancing the film by rotating the film-winding tool (46) between each exposure; withdrawing the film-winding tool (46) from the container (18) and closing said opening therein; and opening the enclosure and removing the film container (18) having the pre-exposed film loaded therein.

29 Claims, 15 Drawing Sheets

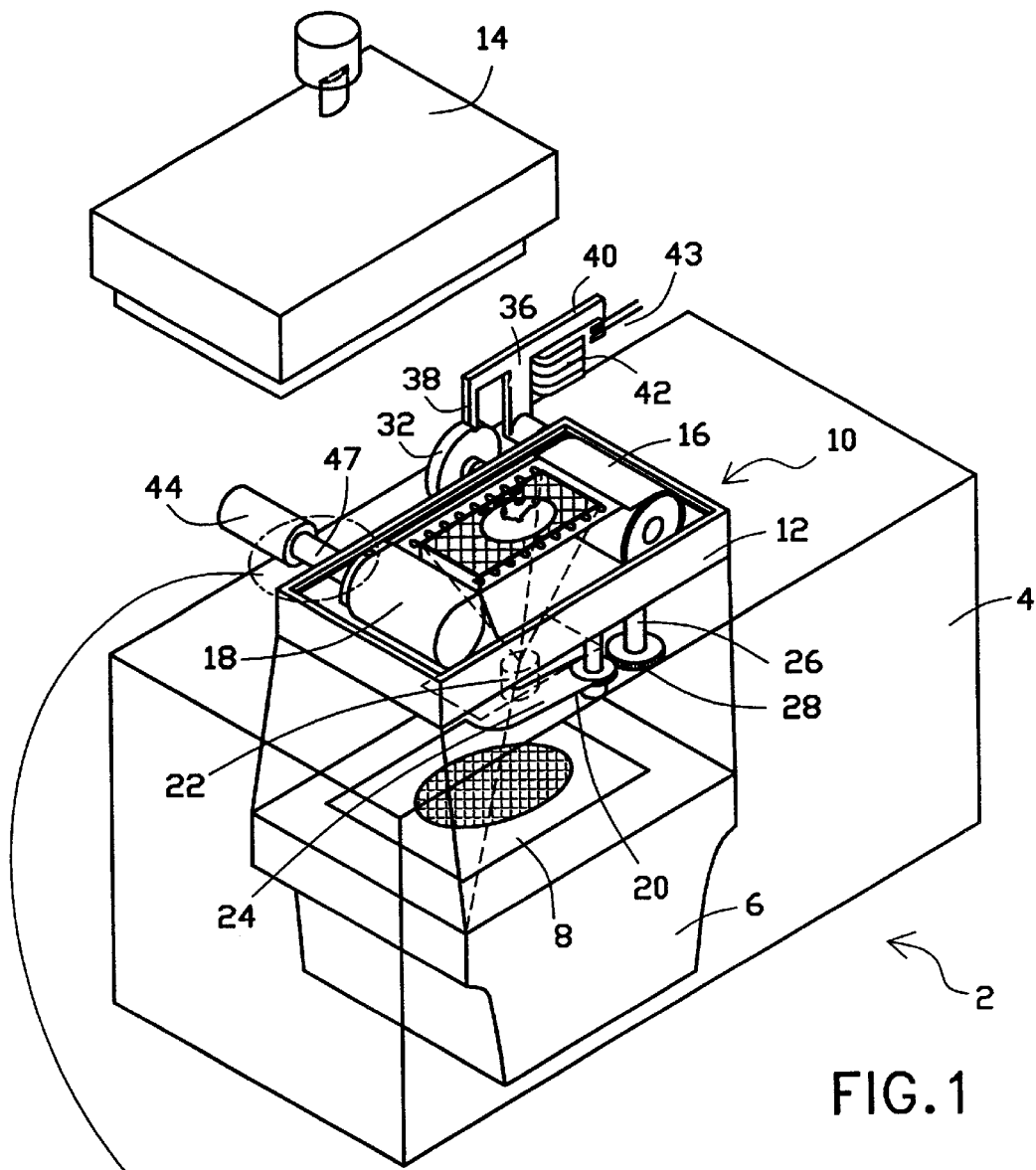
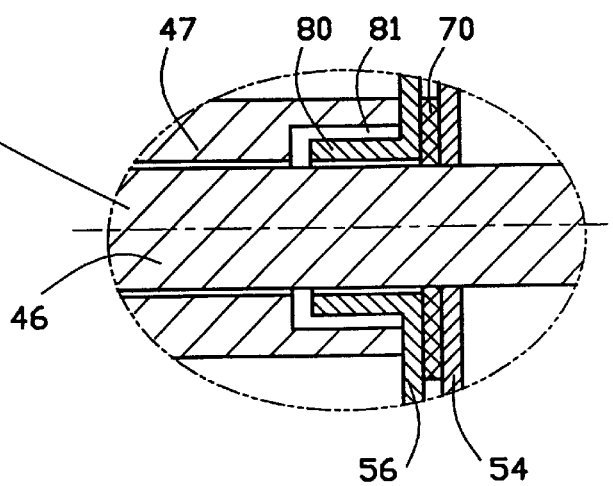
FIG. 1
FIG. 1A

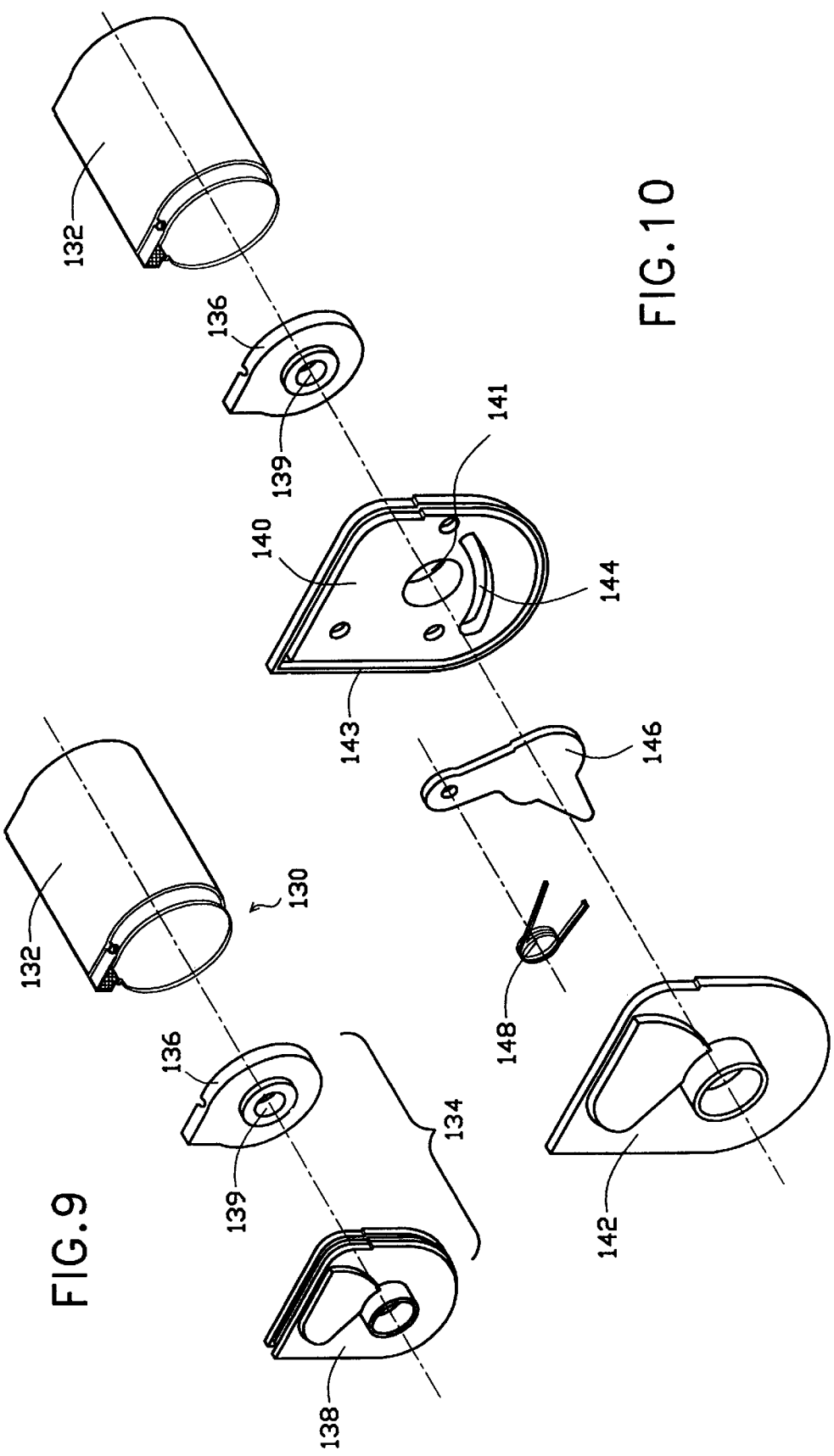

FILM PRE-EXPOSED APPARATUS AND METHOD

BACKGROUND OF THE INVENTION

The present invention relates to an apparatus for and a method of pre-exposing photographic film with images.

It is known to provide photographic film which has been partly exposed in regions of each film frame with an image which is retained as a latent image. The user who loads the film then exposes the film in the normal manner in a specially adapted camera. The camera includes some masking arrangement to mask out the area of the film which bears the latent images, so that these are not double-exposed. When the film has been exposed by the user, it is processed and developed in the normal way, the finished pictures bearing both the pre-exposed images provided by the manufacturer (hereinafter referred to as "pre-exposed images"), and the user-exposed images thereon. For example, it can be arranged that the film is pre-exposed with a decorative strip which carries a message such as "happy birthday" or "wish you were here", the camera including a strip-like mask in the exposure window to prevent double-exposure of the pre-exposed film region.

Various pre-exposure techniques are known. For example, it is known to place the unexposed film in contact with a length of master film carrying a sequence of images thereon, and to move both past a light source, whereby the images are transformed to the unexposed film. This method is not only time-consuming, but is inflexible in terms of the images which can be produced.

It has also previously been proposed by the applicant in U.S. Pat. Ser. No. 09/092,607 to utilize a technique whereby the images are stored digitally and generated by a cathode ray tube beam which is scanned sequentially over each film frame. In a further development, the image is generated on a computer monitor. These techniques allow a wide variety of different selected images to be readily stored in a computer memory or disc, retrieved and exposed onto the film. In this method, the film comprises a bulk roll of film which must, once pre-exposed, still be further handled by cutting into appropriate lengths and placed into the film cassette, which is both time-consuming and thereby expensive.

The present invention seeks to provide an apparatus and a method allowing simultaneous pre-exposure and film loading.

In recent years cameras known variously as disposable or single-use cameras, or referred to by some as lens-fitted photographic film packages, have become increasingly popular. These are cameras of simple construction and low cost which are usually pre-loaded with film by the manufacturer. It is usually arranged that the film is unwound from the standard film cassette or patrone, and as pictures are sequentially taken the film is wound back into the cassette. Once the user finishes the film, the user returns the entire camera to the photolab for developing of the film. The manufacturer may then either discard the camera in its entirety, or subject to appropriate checks that the camera is still functional, re-load the camera. Alternatively the manufacturer may re-use specific components of the camera.

One consideration with such a camera is the ease of loading of the film, particularly given the requirement that the film must be pre-wound out of the film cassette before use. In view of the low cost of the camera itself manufacture and assembly costs are important, and this includes the cost of loading the film into the camera at the factory. It is highly desirable to utilize a method which is simple and cheap and yet reliable.

As the awareness of problems of environmental contamination increases, as well as for economic reasons, consumers are less willing to tolerate disposable products. It has previously been proposed by the applicant to provide a very simple and cheap camera of generally similar construction to a disposable camera and yet which includes adaptations allowing it to be re-used at least several times by a user.

The present invention also seeks to provide the pre-exposed film in the form of a film assembly which can be either supplied in a new camera or packaged and sold to a user who can then re-load their camera.

SUMMARY OF THE INVENTION

According to a first aspect of the invention there is provided a method of pre-exposing photographic film with latent images comprising the steps of: (a) providing a film container having a housing defining a film slot therein and a film-winding tool opening; (b) providing a roll of unexposed film; (c) securing a leading end of the film to a film-winding tool arranged on the opposite side of an exposure opening from said roll of unexposed film and enclosing the film leading end and winding tool end in the container with the tool extending from the film-winding tool opening; (d) enclosing the film container and roll of film in a light-tight enclosure; (e) sequentially exposing the film to a series of images directed onto the film, and advancing the film by rotating the film-winding tool between each exposure; (f) withdrawing the film-winding tool from the container and closing said opening therein; and (g) opening the enclosure and removing the film container having the pre-exposed film loaded therein.

In one embodiment, the roll of unexposed film is provided wound in a further film container, which is a conventional film patrone.

The combination of conventional film patrone and additional film container with the majority of the pre-exposed film wound therein but connected to the film patrone constitutes a film assembly which can be loaded into a new camera for sale to a user, or may be packaged for sale to a user allowing the user to re-load their camera, as discussed further below.

As an alternative to providing the unexposed film in a film patrone, the roll of unexposed film can be a bulk roll of film, the method further involving prior to step (g), cutting the wound pre-exposed film from the bulk roll, and after step (g), securing the cut end to a further film container. The further film container is then preferably a conventional film patrone having a central spool, the cut end being secured to the spool.

In a preferred embodiment the film container has a housing having an open end closed by an end cover which defines therein an opening closed by a resiliently biased shutter plate, at step (f) the shutter plate closing the said opening on removal of the film-winding tool. At step (c) the film-winding tool end is inserted through the opening of the end cover with the end cover detached from the housing and the shutter open, and thereafter the film end is secured to the film-winding tool, followed by securing the housing to the end cover.

The method may involve the step of cutting a film alignment notch into an edge of the film.

The advance of the film may be detected by sensing means adapted to stop the film advance and output a signal communicated to said film exposure means after the advance of the film through a distance corresponding to one film frame.

In a further aspect the invention resides in an apparatus for pre-exposing film with latent images comprising: means for enclosing a roll of unexposed film; means for enclosing a film container adapted to receive pre-exposed film; a film-winding tool extending into said means for enclosing the film container; and image generating means for generating an image to be exposed onto the film. The film-winding tool is retractable whereby it can be at least partly withdrawn from the means for enclosing the film container. The means for enclosing the roll of unexposed film, and the means for enclosing the film container comprise a light-tight housing defining an aperture through which said film-winding tool extends.

The sensing means is preferably arranged to detect the passage of the film, the sensing means being operatively connected to control means, which control means are operatively connected to the film-winding tool. The control means is a computer or other processing means programmed to control the film-winding tool and the image generating means.

The sensing means may comprise a sprocket wheel for contacting the film, connected to a sensing wheel having a slot cut therein and arranged to rotate by one revolution for every single frame which is advanced. A rocker is provided adjacent the sensing wheel, a first arm of the rocker abutting the periphery of the sensing wheel, and a second arm engaging a relay switch, whereby a stop signal is generated when the first arm engages in the slot.

The sensor may instead comprise an infra-red sensor adapted to detect the passage of film sprocket holes.

The apparatus includes a film cutting punch to sever the pre-exposed film from the remaining exposed film, and a notch-cutting punch to cut an alignment notice in the periphery of the film.

The invention may also reside in an apparatus as described above in combination with a first film container comprising a housing and an end cover defining an aperture therein which is closed by a movable shutter plate, and further in combination with a conventional film patrone containing a roll of unexposed film.

Alternatively, the invention may reside in an apparatus described above in combination with a bulk roll of unexposed film.

In a further aspect the invention resides in a method of pre-exposing photographic film with latent images comprising the steps of: (a) providing a film container having a housing defining a film slot therein; (b) providing a roll of unexposed film; (c) securing a leading end of the film to a film-winding tool arranged on the opposite side of an exposure opening from said roll of unexposed film; (d) enclosing the film-winding too end having the leading end of film attached thereto and the roll of film in a dark environment; (e) sequentially exposing the film to a series of images directed onto the film, and advancing the film by rotating the film-winding tool between each exposure; (f) removing the wound coil of film bearing latent images thereon from the film-winding tool and enclosing this in the film container.

The film container here comprises a housing formed of two halves which co-operate to form a light-tight container having a film exit slot, wherein at step (f) the coil is placed between the halves which are secured together to enclose the coil of film therebetween with the film extending through the film exit slot.

In a still further aspect the invention resides in a method of pre-exposing photographic film with latent images comprising the steps of: (a) providing a film container having a housing defining a film slot therein and which is open at one end, and defining a film-winding tool opening; (b) providing a roll of unexposed film; (c) securing a leading end of the film to a film-winding tool arranged on the opposite side of an exposure opening from said roll of unexposed film and enclosing the film leading end and winding tool end in the housing with the tool extending from the open end; (d) enclosing the housing and roll of film in a dark environment; (e) sequentially exposing the film to a series of images directed onto the film, and advancing the film by rotating the film-winding tool between each exposure; (f) withdrawing the film-winding tool from the housing and closing the said open end with an end cap.

BRIEF DESCRIPTION OF THE DRAWINGS

Embodiments of the invention are now described, by way of example only, with reference to the following drawings in which:

FIG. 1 is a view of a film pre-exposure apparatus in accordance with a first embodiment of the invention;

FIG. 1A is an enlarged cross-sectional view of the film-winding tool inserted into a film container;

FIG. 9 shows a further alternative film container;

FIG. 10 shows the film container of FIG. 9 in exploded form;

DETAILED DESCRIPTION OF THE PREFERRED EMBODIMENT

Figure 2:
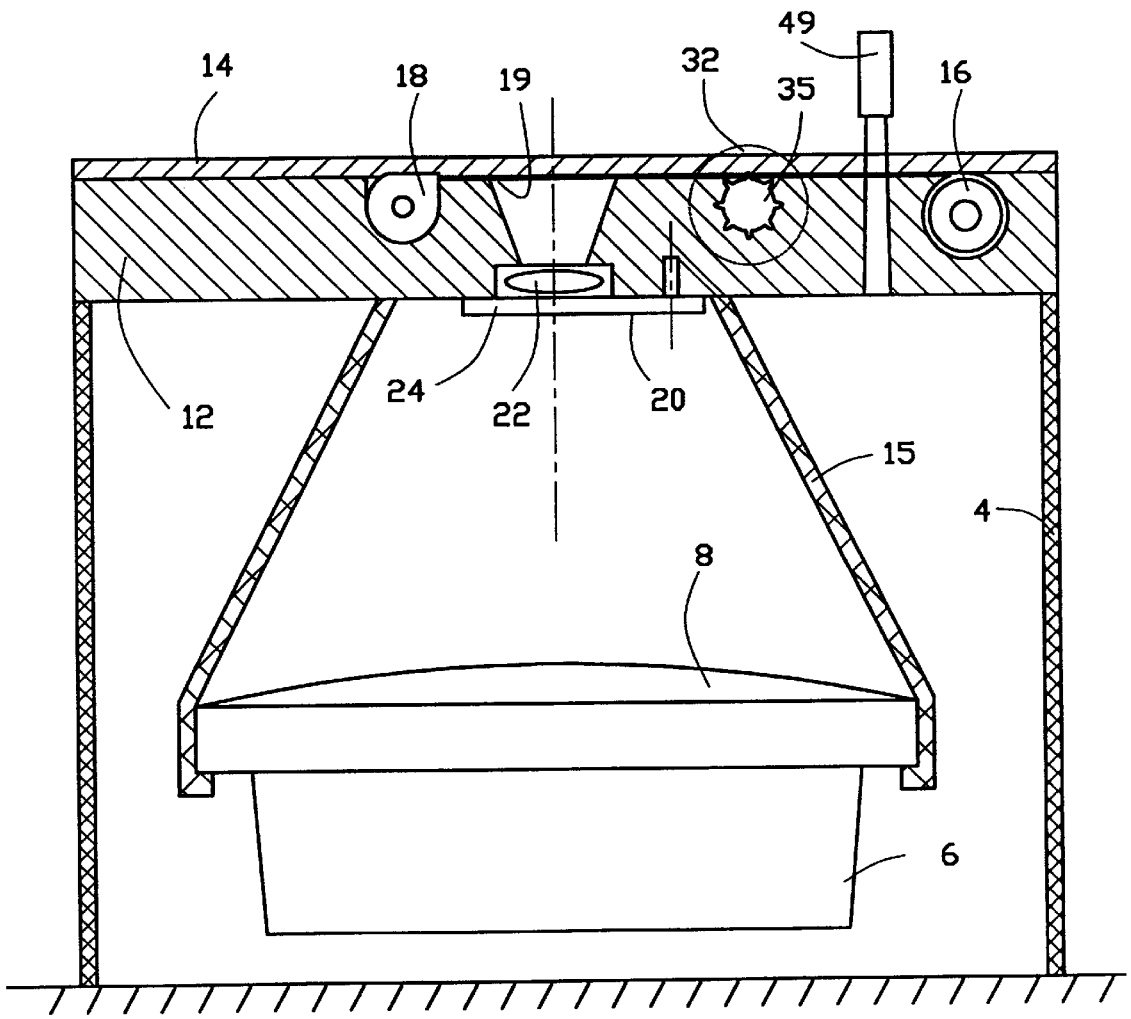
FIG. 2 is a schematic cross-sectional view through the apparatus of FIG. 1.

Turning to the drawings, FIG. 1 shows a perspective view of the pre-exposure and loading apparatus in accordance with a first embodiment of the invention. The apparatus generally indicated 2 has a light-tight housing 4 which contains an image generating apparatus, which in the illustrated embodiment is a conventional computer monitor 6, which has an upwardly directed screen 8. Located above the housing 4 is a film loading station 10 having a lower housing part 12 and a light-tight cover 14 which can be removably fitted thereto. A light-tight hood 15 extends from the monitor screen 8 to the underside of the loading station. The lower housing part 12 is adapted to receiving a pair of film containers including a first conventional 35 mm film cassette or patrone 16 and an additional film container 18 further details of which will be described below. The housing 4 is in light communication with the lower housing part 12 through an exposure window 19. Arranged between the exposure window and the screen 8 of the monitor 6 is a lens 22 which focuses the light from the monitor onto the film, and an exposure shutter 20.

The exposure shutter 20 comprises a pivotably mounted blade 24 which is operatively engaged through a toothed region thereon with a shutter control motor 26 having a drive gear 28 which serves to effect the opening and closing of the shutter 20.

Arranged adjacent the lower housing part 12 is a film advance sensing mechanism 30 including a sensing wheel 32 having a shaft 34 connected through the wall of the housing part 12 to a sprocket wheel 35 for engaging the film sprocket holes. A rocker 36 arranged next to the wheel 32 has a first arm 38 which abuts the wheel 32 and can engage in a slot cut in the periphery of the wheel 32 and a second arm 40 arranged adjacent a solenoid 42, and bearing on a microswitch 43.

Also arranged adjacent the lower housing part 12 is a film-winding motor 44 having a shaft 46 protruding into the housing 12 through an opening in the lower housing part. The shaft 46 extends through a sleeve 47 making a light-tight fit therein, as best seen in FIG. 1A which is a cross-sectional view of the shaft 46 and sleeve 47 fitted up against the end cover of a film-receiving container. The motor 44 and shaft 46 are mounted on a slide so that the shaft 46 can be extended into a film-receiving container and retracted therefrom. The shaft end constitutes a winding tool and has a longitudinal split end portion for receiving a leading end of film as discussed further below. Arranged in the cover 14 is a punch 49 for cutting an alignment notch in the edge of the film, also as discussed further below.

Figure 5:
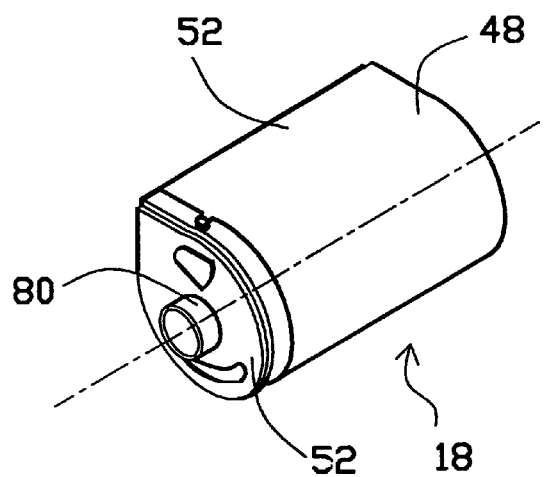
FIG. 5 shows a film container with winding tool access shutter.
Figure 6:
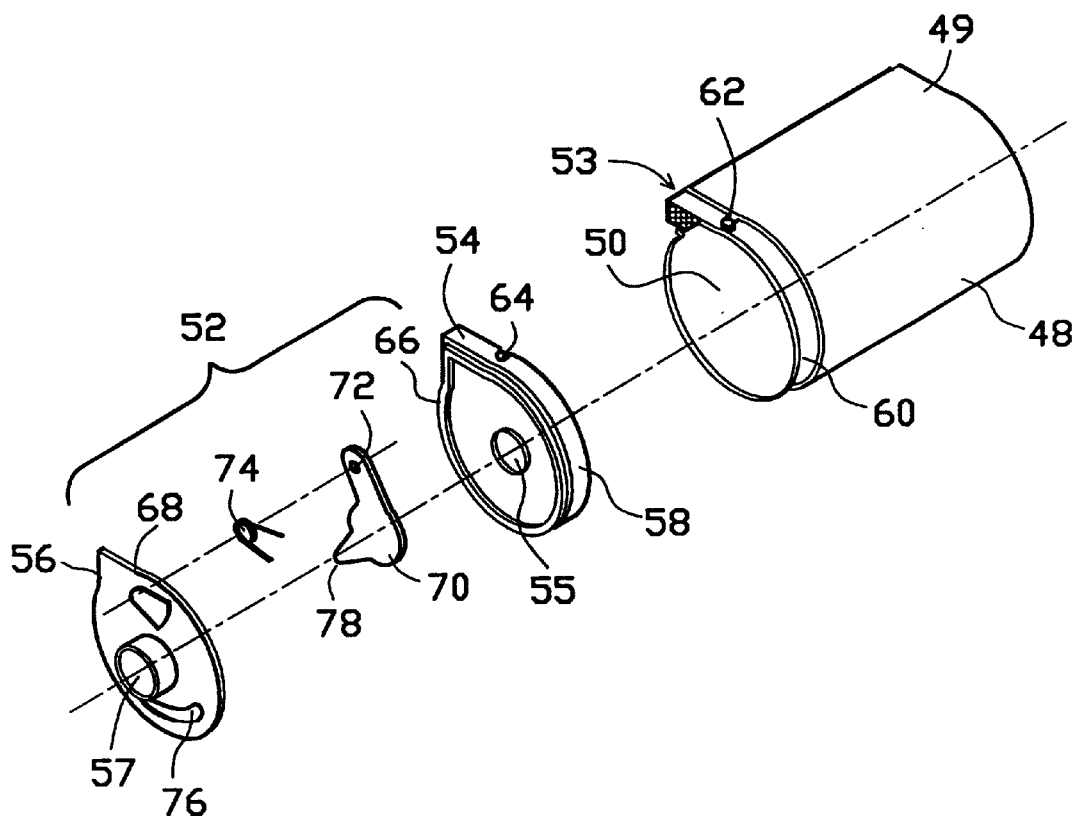
FIG. 6 is an exploded view of the film container of FIG. 5.

As shown in FIGS. 5 and 6, the container 18 comprises a generally cylindrical or cup-like housing 48 closed at one end 49 and open at the opposite end 50. The housing 48 does not contain any spool therein. At a region of the side wall of the housing there is a flattened portion 51 which defines adjacent thereto an elongate film slot 53 which is preferably lined by a soft fabric-like material such as velvet or similar in order to ensure the slot is light-tight whilst providing soft non-scratching surfaces for the passage of the film therethrough. At the open end 50 the housing is closed by an end cover 52. The end cover 52 itself comprises an assembly which has a pair of plates including inner plate 54 and outer plate 56 both formed with coincident apertures 55 and 57 respectively. The inner plate 54 includes a depending peripheral flange 58 which is in use fitted over a reduced-diameter end portion 60 of the housing 48 making a tight push-fit therewith. The end portion 60 may be provided with a number of protrusions 62 which snap-over fit into corresponding openings 64 or recesses in the flange 58. The inner plate 54 also includes an upstanding flange or rim 66 in which an outer periphery 68 of the outer plate 56 sits, maintaining a slightly spaced relationship and defining a thin cavity therebetween. The plates may be joined by adhesive or ultrasonic welding or other conventional means.

Within the cavity there is arranged a movable shutter plate or blade 70 which is pivotably supported at 72 on a simple pin. Leg spring 74 one leg of which abuts the rim 66 and the other of which abuts the shutter plate 70 urges the plate 70 into a "closed" position whereby it blocks the apertures 55 and 57. The outer plate 56 is provided with an arcuate slot 76. A protrusion 78 on an arm of the shutter plate 28 extends into the slot 76 allowing the user to manually open the shutter. The outer plate 56 is also provided with an upstanding collar portion 80 which surrounds the aperture 57.

Figure 15:
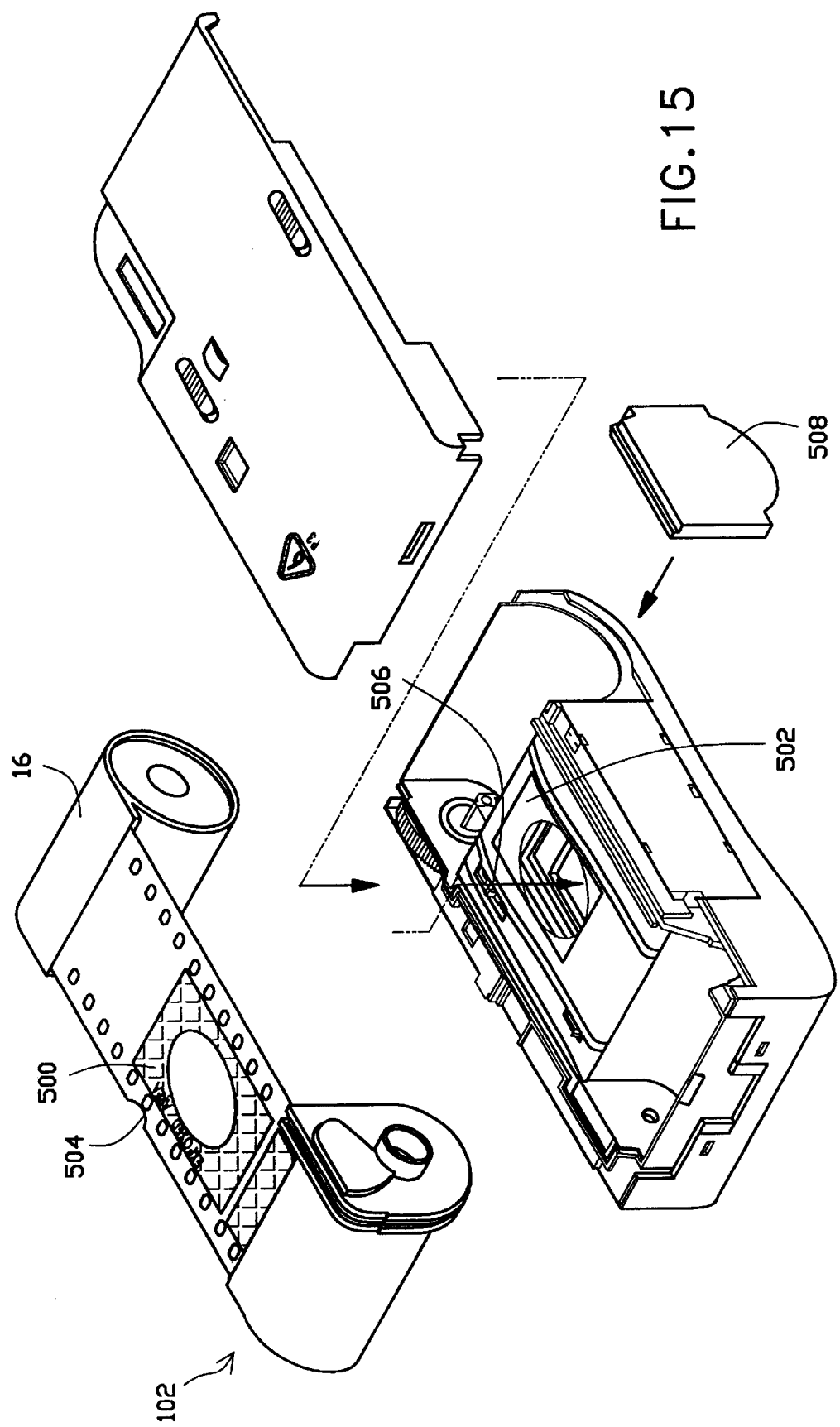
FIG. 15 shows a film assembly having pre-exposed film being fitted into a camera.

The container 18 is used in a camera in combination with an additional film container which together constitute a film assembly. The additional film container is preferably a conventional 35 mm film cassette or patrone 16 having a central spool on which the film 37 is wound. FIG. 15 shows a film assembly comprising a film patrone 16, and a film container 102 (which is further described below) with the majority of the pre-exposure film wound in the container 102, but extending and secured to the film patrone 16. The film has a pre-exposed border region, schematically indicated 500. The film is used in a camera which includes suitable masking means 502 so that only the central oval region of film is exposed by the user. With this film it is important that the pre-exposed image is appropriately positioned with respect to the exposure window to ensure correct alignment of the user-exposed image and for this purpose the film has an alignment notch 504 or indicia, whilst the camera has an alignment mark 506 adjacent the upper film guide near the sprocket wheel. On insertion of the assembly into the camera the user or loader must ensure the notch 504 is aligned with the marking 506. It will be appreciated that as pictures are taken by the user the film is progressively wound back into the film patrone 16, and once the film is finished the patrone 16 is removed via the door 508 and processed, whilst the container 102 may be discarded.

Figure 7:
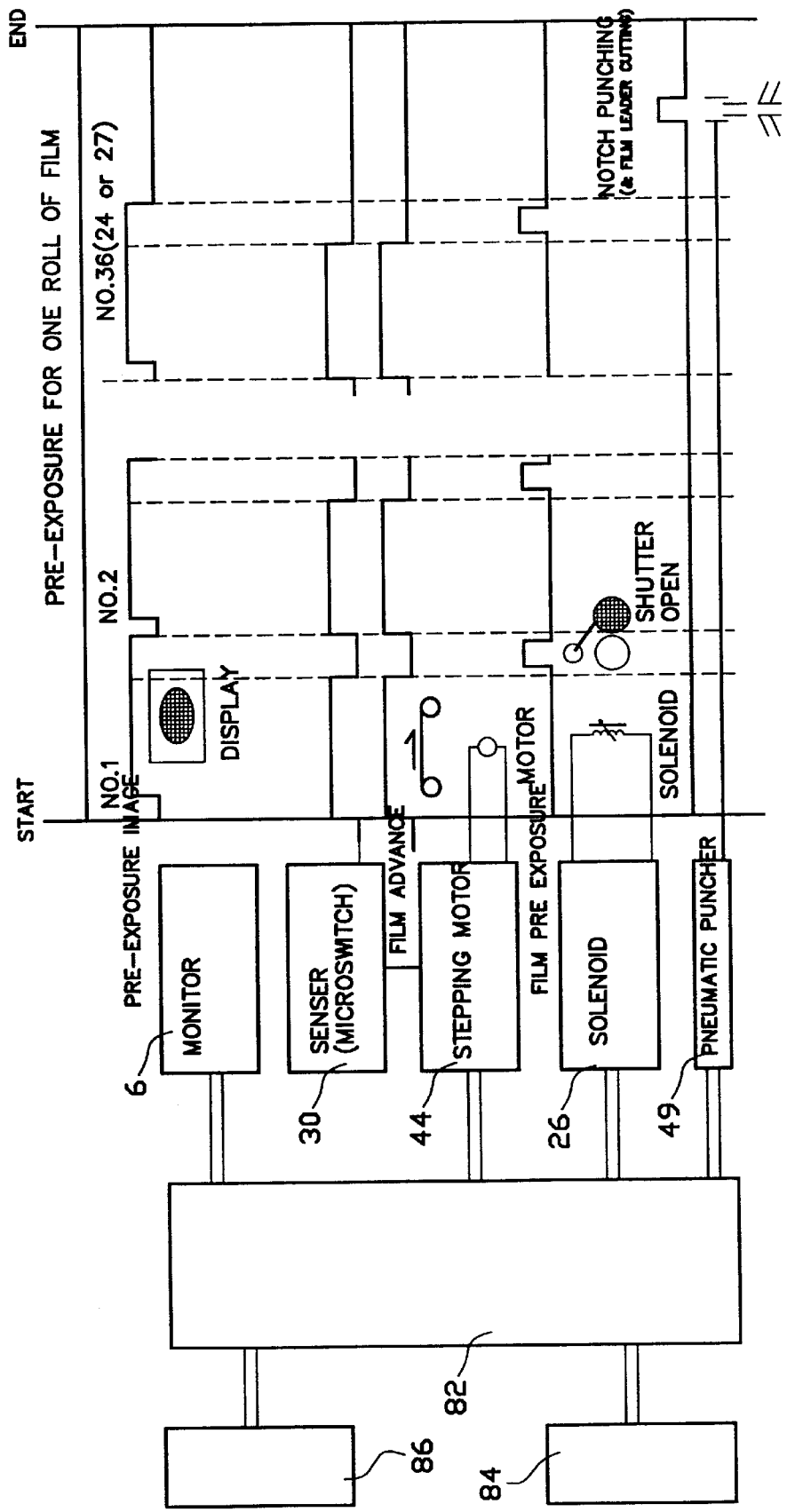
FIG. 7 is a diagrammatic system overview also illustrating an exposure method.

Turning now to FIG. 7 a schematic representation of the system is shown on the left hand side of the Figure. The system has a computer or other processing means 82, means for inputting commands into the computer, such as a keyboard or mouse 84. The computer is operatively connected to the monitor 6, and through an appropriate interface to the film advancing motor 44, to the shutter solenoid 26, and to the pneumatic punch. The computer 82 may store therein for example on its hard disc a plurality of images, or they may be loaded through an external recording means such as a floppy disc or CD-ROM, indicated at 86.

The pre-exposure and film loading process is now described in detail. A conventional film cassette 16 having totally unexposed film therein is provided with the leading end of film protruding therefrom. The second or additional film container as shown in FIGS. 5 and 6 is provided, the end cover 52 is removed from the housing 48, and using a sharp tool the protrusion 78 of the shutter 70 is engaged to open the shutter 70. With the shutter 70 open, the end cap is placed over the end of the winding tool 46, so that the end cover 52 abuts the sleeve 47 making a light-tight connection therewith. Specifically, the end of the sleeve is provided with a recess 81 into which the collar 80 of the end cover 52 protrudes, as best seen in FIG. 1A. Thereafter, the leading end of the film is secured into the split end region of the winding tool 46, and the housing 48 is then fitted over the tool end and film so that the film extends through the film slot 53. The housing 48 is snap-fitted onto the end cover 52, thereby forming a light-tight container 18. The cover 14 is placed on the lower housing 12 to form a light-tight enclosure.

At the start of the exposure sequence the motor 44 is operated to advance the film out of the patrone 16 and into the second film container 18 across the exposure window 19.

Shortly after the start of winding the computer 82 displays on the monitor 6 an image to pre-exposed on the film. As indicated in FIG. 1 the monitor displays a border region, leaving a dark or imageless central oval region, whereby a central oval area of the film is left unexposed for exposure by the user, so that the user's image appears in the pre-exposed border. At this time the exposure shutter 20 is closed so that even though the image is displayed on the monitor it does not reach the exposure window 19. As the film is being wound, the sprocket wheel 35 is rotated, causing sensor wheel 32 to rotate. The arm end 38 rests on the outer periphery of the wheel 32. Once the cut-out of the wheel 32 becomes aligned with the arm 38 the rocker arm pivots under the weight of the arm 38 (arranged to be heavier than arm 40) thereby engaging in the slot and breaking the electrical contact of the microswitch and the motor 44 is stopped. Shortly after the motor is stopped the exposure shutter solenoid 26 is operated to open the exposure shutter 20 for a predetermined period which is sufficient to provide appropriate exposure of the pre-exposed image on the film.

The shutter 20 is closed after the predetermined time and shortly thereafter, the solenoid 42 is operated to pull the arm 40 downwards, closing the microswitch 43 so that the motor 44 is again operated to wind the film on, the sprocket wheel 35 and sensor wheel 32 again rotating until the cut-out in the sensor again becomes aligned with the cut-out of the sensor wheel at the position of the next exposure. FIG. 7 illustrates the operative state of the various components through the cycle.

This operation continues, successively exposing a sequence of images at appropriate spacing, along the film, until the computer detects that sufficient frames (usually 24 or 36 or 27) have been exposed, at which time instead of re-activating the motor 44 at the beginning of the cycle, a signal is sent to the pneumatic punch 49, which thereby punches an alignment notch 51 in the edge of the film.

The film-winding tool 46 is then retracted. As it exits the end cover 52, the shutter 70 snaps closed, rendering the container 18 light tight. The film assembly of first and second film containers 16, 18 with the majority of the film wound in the second container 18 is then removed by opening the cover 14 and lifting out the assembly. The assembly is then ready for placing into a new camera, in the case where the camera is sold ready loaded to a user, or can be packaged and sold to user to allow the user to re-load their own camera.

It can alternatively be arranged that instead of generating an image on the monitor 6 which corresponds exactly to the image to be pre-exposed, an image may be displayed across the entire monitor screen, but a mask arranged in the lower casing part 12 in the exposure window to obscure a part of the film. For example, where the pre-exposure is to add a border region, with the user's image appearing as an oval image in the centre of the border, an oval shaped mask is used.

Figure 3:
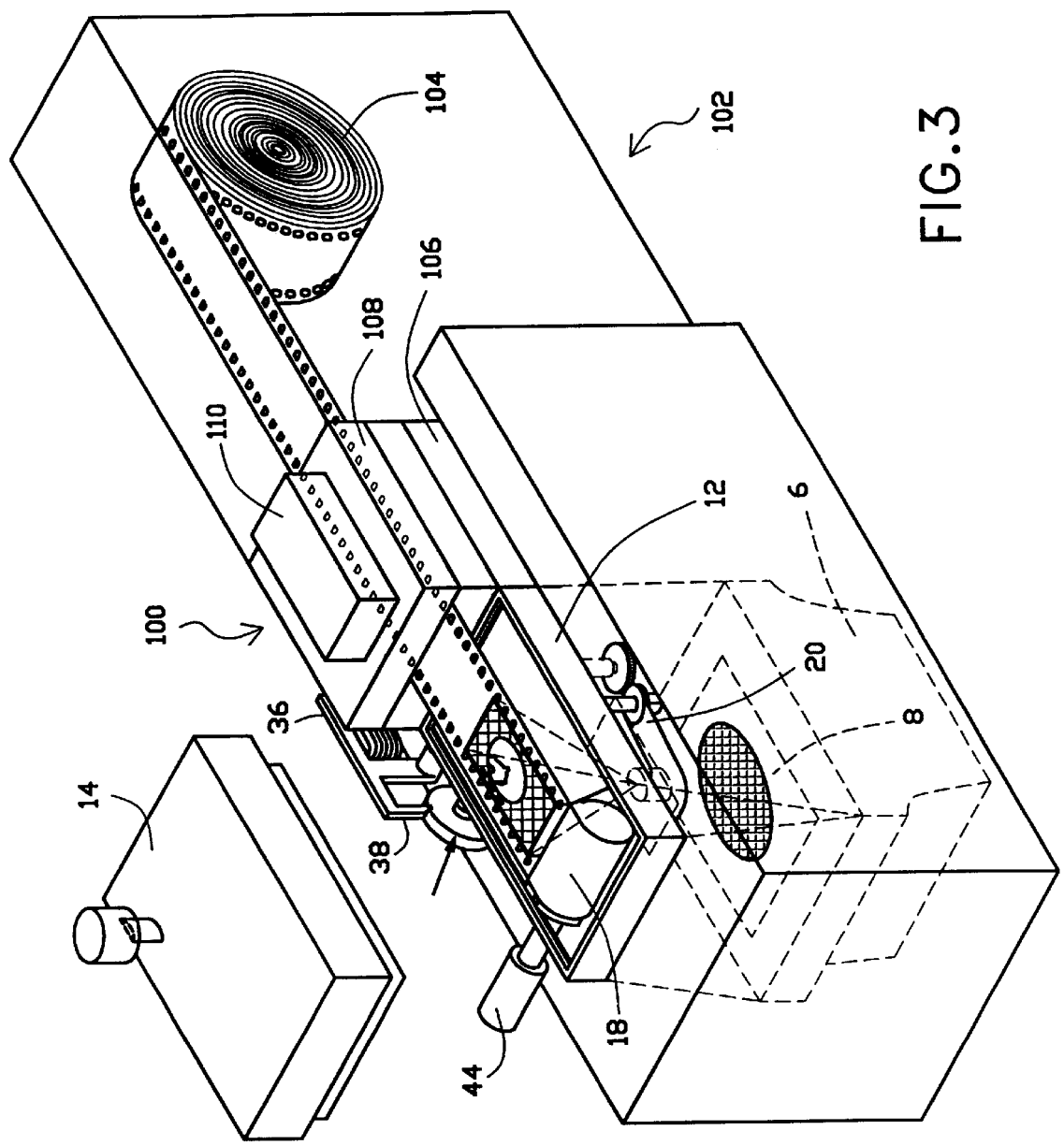
FIG. 3 is a view of film pre-exposure apparatus in accordance with a second embodiment of the invention.
Figure 4:
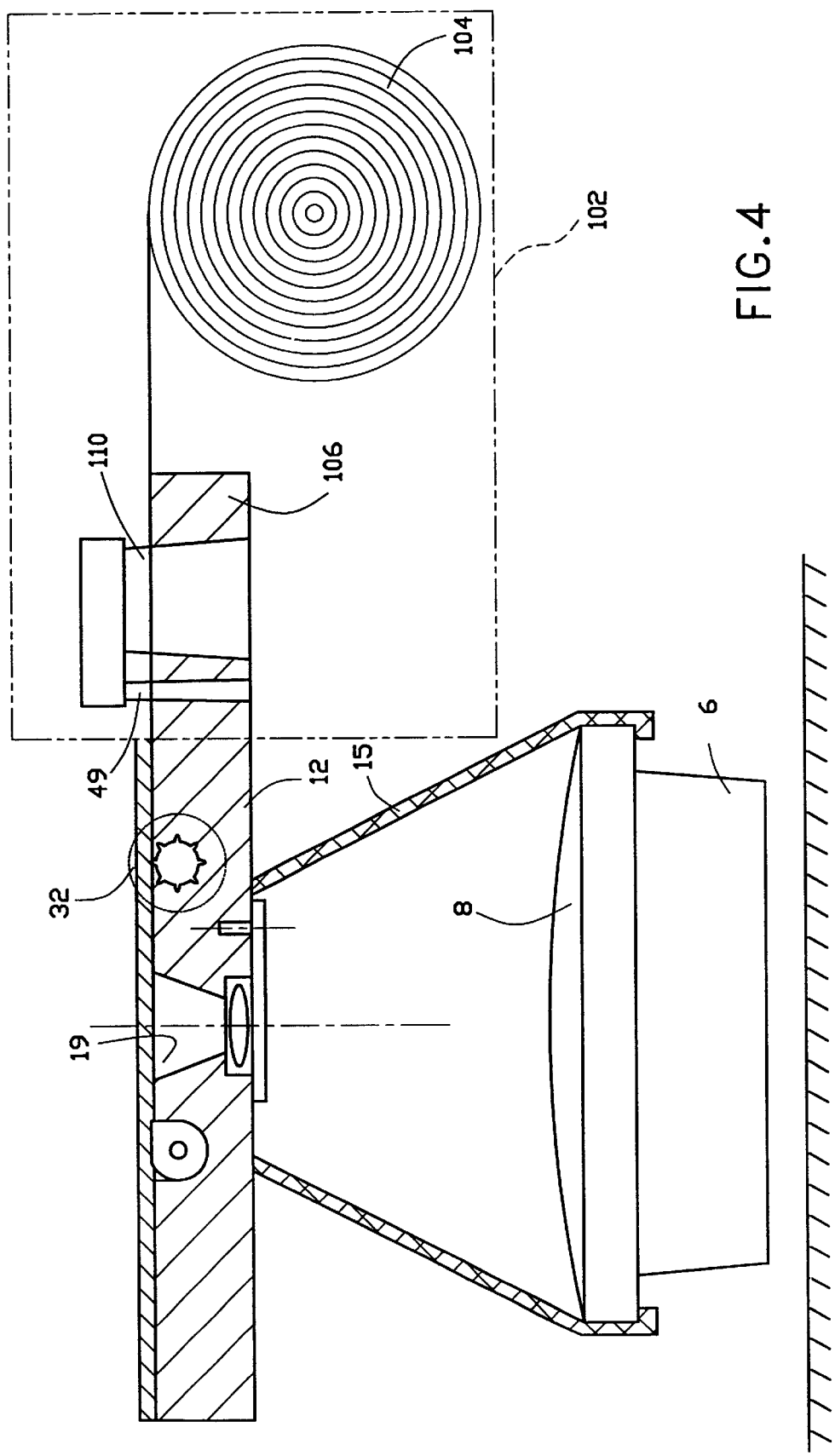
FIG. 4 is a schematic cross-sectional view through the apparatus of FIG. 3.

FIGS. 3 and 4 show an alternative pre-exposure and winding apparatus which is adapted for film-winding from a bulk roll of film. The apparatus is generally similar to that of the first embodiment illustrated in FIGS. 1 and 2, and like parts are indicated with like reference numerals. The major difference is that adjacent the film-winding station there is arranged a film cutting station 100 and adjacent thereto a bulk film dispenser 102.

The bulk film dispenser 102 comprises a light-tight housing 102 which supports therein a bulk roll or "pancake" of film 104 which may be supported on a central axle (not shown). A motorized film advance mechanism may also be provided, as is conventional. The housing 102 has a light-tight slot through which the film passes. The film cutting station 100 comprises a base 106 and an upper casing 108 defining therebetween a film passageway. The upper casing 108 has a central punch 110 which is a pneumatically operated punch arranged to sever the film and to cut a trailing end 112 in the film which has passed therethrough, and a new leading end 114 in the bulk film. Although the housing 102 and cutting station 100 are shown as adjacent to each other, the housing could be enclosed the cutting station, as indicated in FIG. 4.

Figure 8:
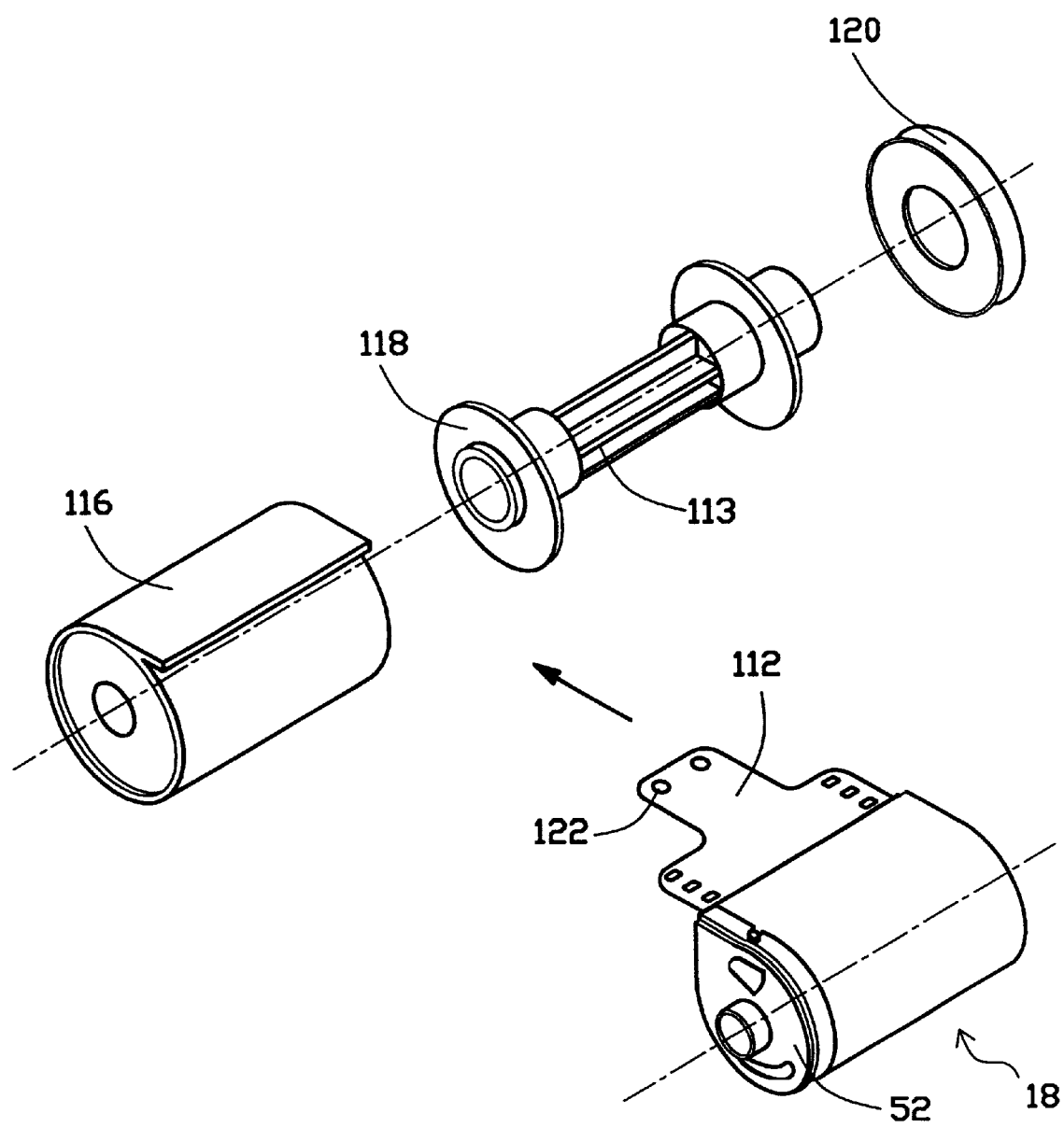
FIG. 8 shows the step of attaching a container of pre-exposed film to a conventional patrone.

The operation of the apparatus is very similar to that described above, with a number of differences as now described. Instead of starting with a loaded film cassette, as in the first embodiment, the operator feeds the leading film end entirely through the cutting station and into the exposure station. The leading film end is secured onto the film-winding tool end 46 and the container 18 secured over the film in the same manner as described above. Similarly, film exposure and winding is effected in the manner as described above. Once the last frame has been exposed the notch is cut with the notch punch 49. This is followed by severing of the film by operation of the punch 110. The film-winding tool end 46 is retracted, the winding tool access shutter snapping closed to render the container 18 light tight. The cover 14 is opened and the container 18 removed. The cut trailing end 112 is then secured to a conventional film patrone. As shown in FIG. 8 the conventional film patrone 104 comprises an outer housing 116, a spool 118 and a securing ring 120. The spool 118 is provided with an axially extending slot 113 to receive the tongue 112 of the film. Adjacent the slot although not illustrated there are provided a pair of projections which engage the two holes 122 of the tongue 112, as is conventional, to thereby reliably hold the end of the film on the spool 118. The spool 118 with the film attached is then inserted into the container housing 116 so that the film extends through the film slot thereof, and the ring 120 is then fitted to close the patrone. Patrones with a pair of securing rings may likewise be used.

An alternative form of a film container which is generally designated 102 is illustrated in FIGS. 9 and 10. The container 130 has a housing 132 of identical construction to the first embodiment, and an end cover 134 which comprises an intermediate end cap 136 and a shutter-containing end plate 138. The cap 136 has a simple depending flange which fits over the end of the housing 132, and a short upstanding collar 139. The end plate 138 comprises an assembly which is a pair of plates 140 and 142, plate 140 having a peripheral upstanding rim 143 within which the plate 142 sits in spaced relationship therewith. Plate 140 has an arcuate slot 144 therein. A shutter blade 146 is arranged for pivotal movement, also biased into a closed position by spring 148. An arm of the shutter blade 146 carries a projection (not visible) which extends into the slot 144 allowing the user to move the blade 146. The intermediate cap 136 and end plate 138 are joined together by a simple push-fit of the collar 139 which fits into the aperture 141, and optionally in addition by the use of glue or other simple fixing means if it is desired to permanently secure the parts together.

The container 130 is used in a similar way to the container 18 described above. The only difference is that at the initial stage of installing the container 18 it is necessary to firstly fit the end plate 138 over the film-winding tool end with the shutter open, followed by the end cap 136, these two parts being push-fitted together with the collar 139 extending into the aperture 141. The film end is then attached to the tool end and the housing 132 connected to the end cap 136.

Figure 11:
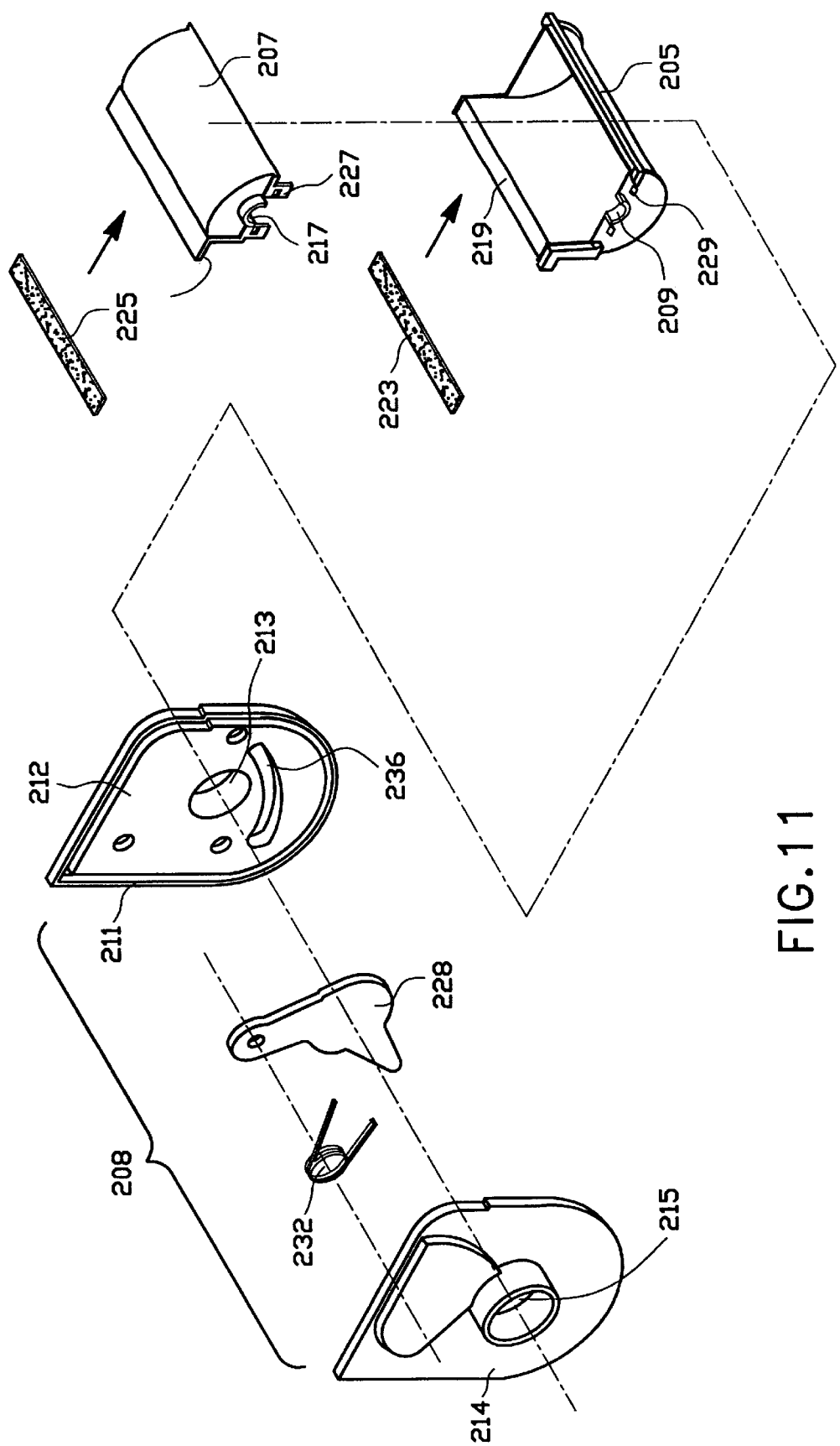
FIG. 11 shows a further alternative film container.
Figure 12:
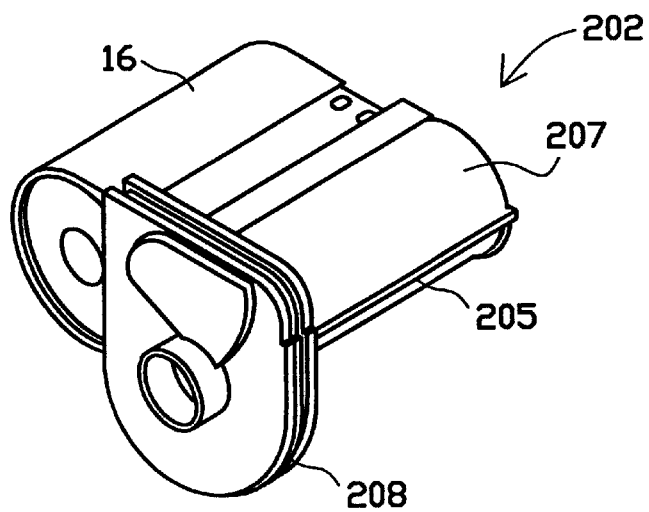
FIG. 12 shows the film container of FIG. 11 secured to a conventional film patrone.

A further film container which can be used is generally designated 202 and is illustrated in FIG. 11 where it is shown in exploded form. The complete container 202 is shown assembled in FIG. 12, here in combination with a film patrone 16 as a film assembly. The film container 202 comprising a housing 204 which is formed as two housing shell halves 205, 207. The shell halves 205, 207 co-operate to form an enclosure having a circular aperture at one end, the opposed curved surfaces which define this being indicated 209, 217, and also define an elongate slot between opposed ledges 219, 221. The ledges 219, 221 are covered by strips 223, 225 of soft fabric-like material which may be secured by means of adhesive or double-sided tape. One or both shell halves may be provided with lugs 227 having apertures or recesses which snap-fit over protrusions 229 on the opposite shelf half to thereby secure the shell halves together. Alternatively, or additionally adhesive or welding may be used.

The container 202 also has an end plate 208 which is of identical construction to the end plate 138 of the above-described embodiment and will therefore not be further discussed. The end plate 208 fits onto the end of the housing 204, the collar 210 formed by the portion 209, 217 extending into the aperture 213.

Figure 17:
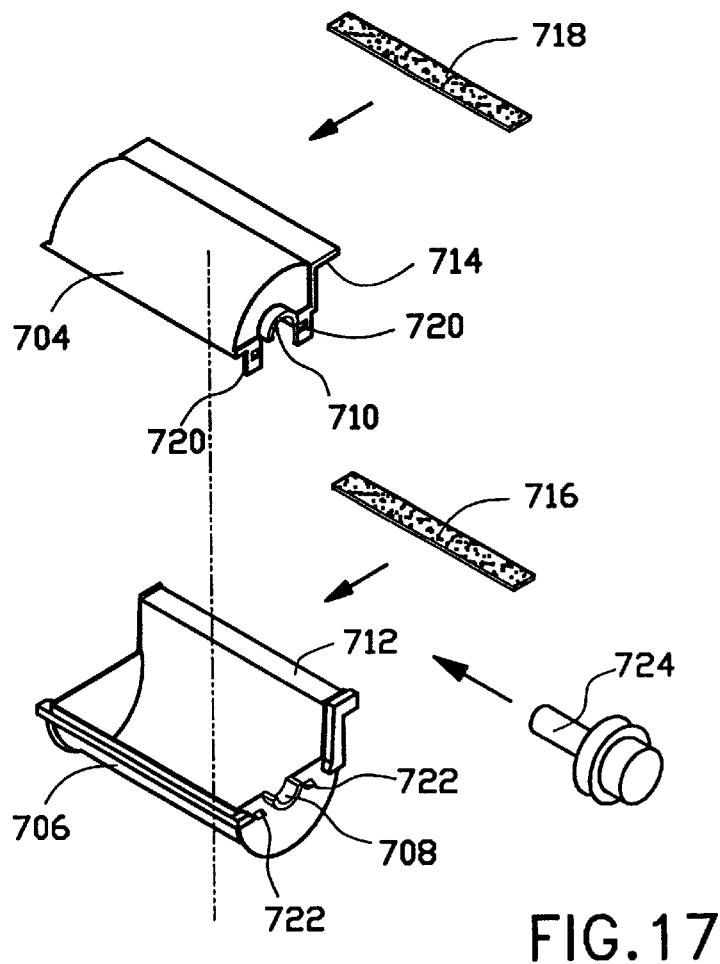
FIG. 17 shows a further alternative film container.

The container 202 is used in a generally similar way to the container 18. With the end plate 208 removed, the shutter blade 228 is opened by accessing the projection on the arm of the blade 228 which protrudes through the slot 236. With the shutter blade 228 open the end plate 208 is fitted over the end of the winding tool. The leading end of the film is then secured onto the split end portion of the tool. The lower shell half 205 of the housing 204 is then fitted into the lower casing part 12 so that it lies underneath the tool 42 with the tool 42 resting on the surface 209. As indicated in FIG. 17, the upper shell half 207 is then push-fitted onto the lower shell half 205 with the lug making a snap-fit connection therewith, with the film extending through the velvet-lined slot. Thereafter, the method of winding is exactly as described previously.

Figure 13:
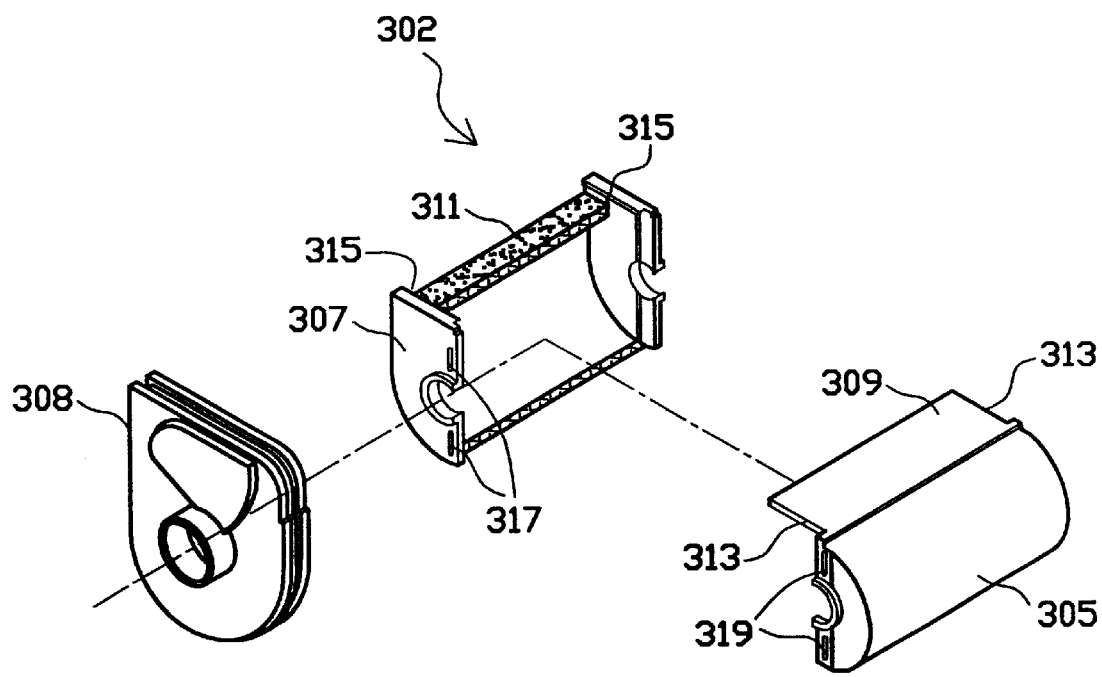
FIG. 13 shows a further alternative film container.

A further alternative structure of the film container 302 is shown in FIG. 13. This is similar to that of the previous version in that the housing comprises a pair of shell halves; however, instead of being divided about a plane which is generally parallel to the plane defined by the exiting film, the housing is divided about a plane perpendicular thereto into shell halves 305, 307. A similar arrangement of protrusions and apertures or recesses is provided to allow the two shell halves to be snap-fitted together. An identical end cover 308 is provided. Shell half 305 has an extended ledge 39 which overlies ledge 311 defining the film slot therebetween, each having a strip of velvet secured thereto. The ledge 309 is provided with edge regions 313 of reduced thickness which slide into slots 315 on the shell half 307. The shell half 307 is also provided with projections 317 which snap-fit into slots 319 on the shell half 305 assisting to hold the two shell halves together.

The use of the specially adapted containers 2, 102, 202, 402 having the shuttered aperture for the film-winding tool in the described apparatus allows the film winding pre-exposure process to be carried out within a simple, compact, light-tight enclosure, allowing the film winder to operate in daylight rather than in a darkroom, and thereby increasing the efficiency of the winding and loading and exposure process.

Figure 14:
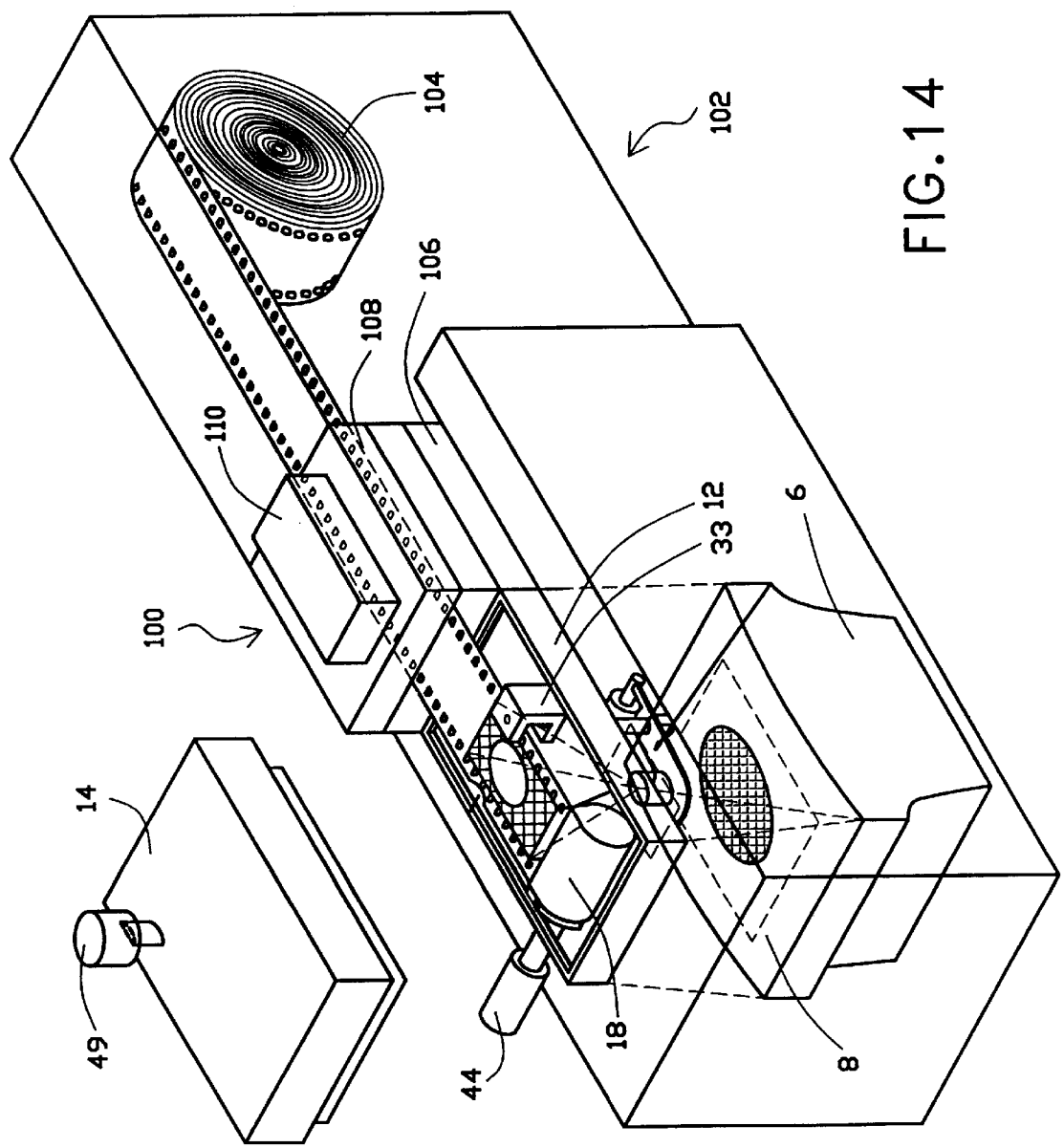
FIG. 14 shows a further alternative film pre-exposure apparatus.

FIG. 14 shows an apparatus which is identical to the apparatus of FIG. 3 with the exception of the sensing means.

Instead of using a mechanical arrangement of sensing the advance of the film, the apparatus uses an infra-red sensor 33 arranged adjacent the film edge at the position of the film sprocket holes. The sensor has a transmitter and receiver, with the film passing therebetween. The sensor 33 detects the passage of the sprocket holes, and outputs a signal to the computer which assesses the precise distance of travel of the film and effects appropriate control of the winding motor 44, monitor 6 and exposure shutter 20. More particularly, the computer is programmed to stop the film advance after the passage of eight sprocket holes, which distance corresponds to the passage of one film frame. Although not illustrated, a similar sensor 33 can be incorporated into the apparatus of FIG. 1 to replace the sensing sprocket 35, wheel 32 and rocker 36.

Figure 18:
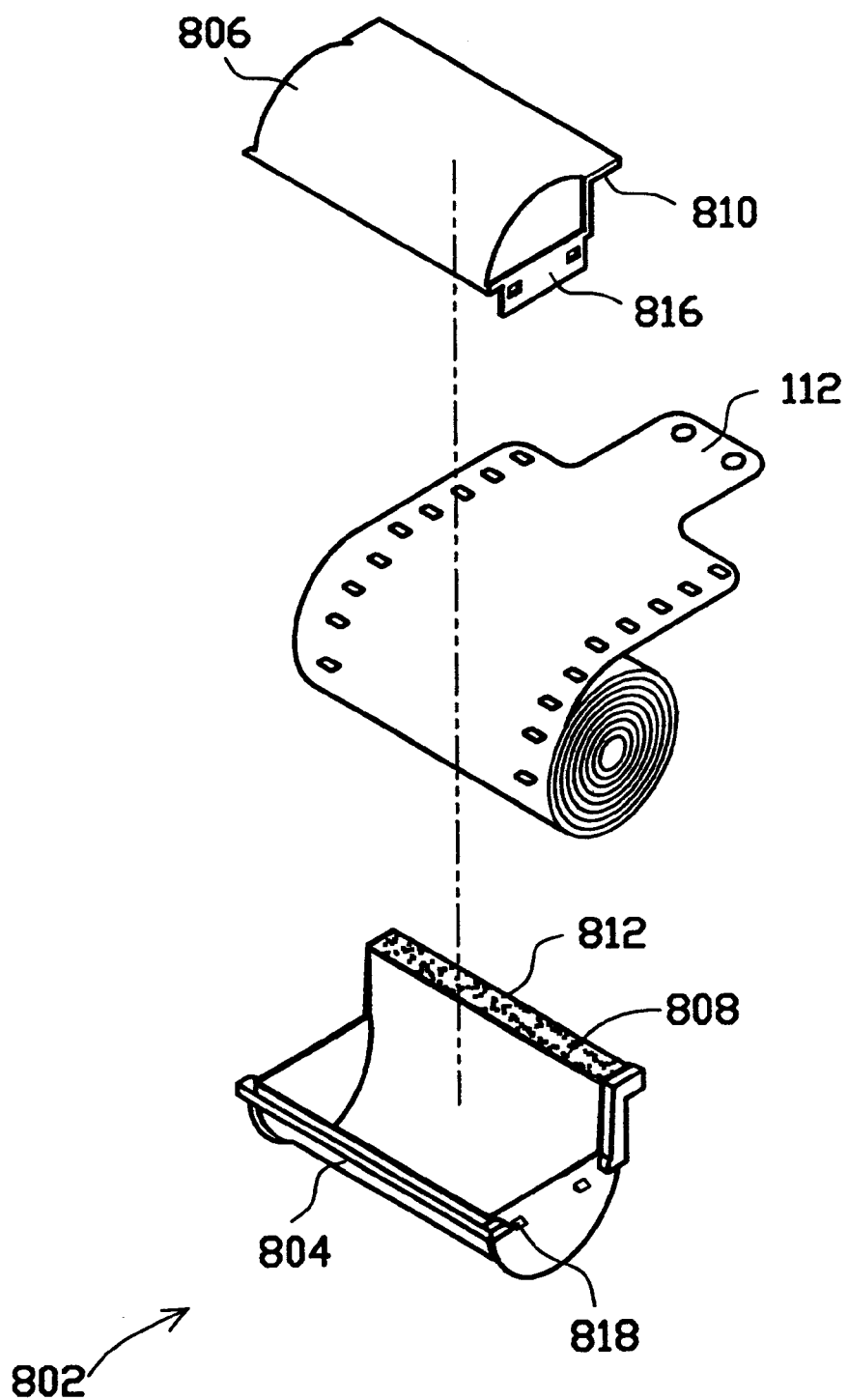
FIG. 18 shows a still further alternative film container.

As an alternative to use of a specially-adapted container having a winding tool access shutter as described, it is also possible to utilize an additional film container of simpler construction without any shutter mechanism, in which case the winding procedure must be done in a darkroom or other dark enclosure. Various possible alternative forms of film container are illustrated in FIGS. 16 to 18.

Figure 16:
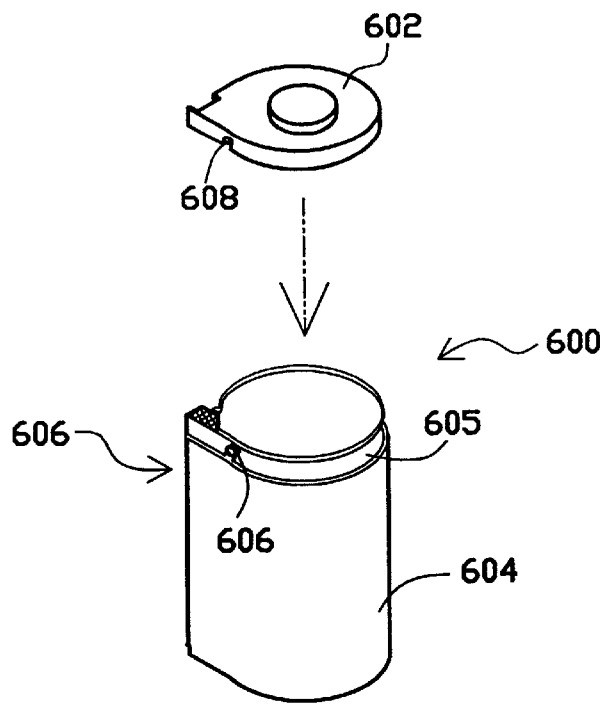
FIG. 16 shows an alternative film container.

FIG. 16 shows an additional film container 600 which is of a similar general shape to a conventional film cassette, but in contrast thereto has no spool and is sealed at one end whilst at the other end includes a removable cap 602. The container has a housing 604 which includes a short region of reduced diameter 605 whereby the cap may be push-fitted onto the top of the container 600 in a light-tight manner. The housing 604 includes a film slot 606 through which the film can extend which is preferably provided with some light-sealing means such as opposed strips of velvet or similar soft material as is used in a conventional film cassette. The housing may also be provided with one or more lugs or pins 606 which are received in corresponding grooves or recesses 608 in order to assist in retention of the cap 602 on the container 604.

It is also preferably arranged that the film container 600 is not of identical size or shape to a conventional film cassette, for example it may be somewhat smaller than a conventional cassette, in order to ensure that the user does not try to fit the conventional film cassette 16 and container 600 in the wrong film chambers in the camera.

Figure 19:
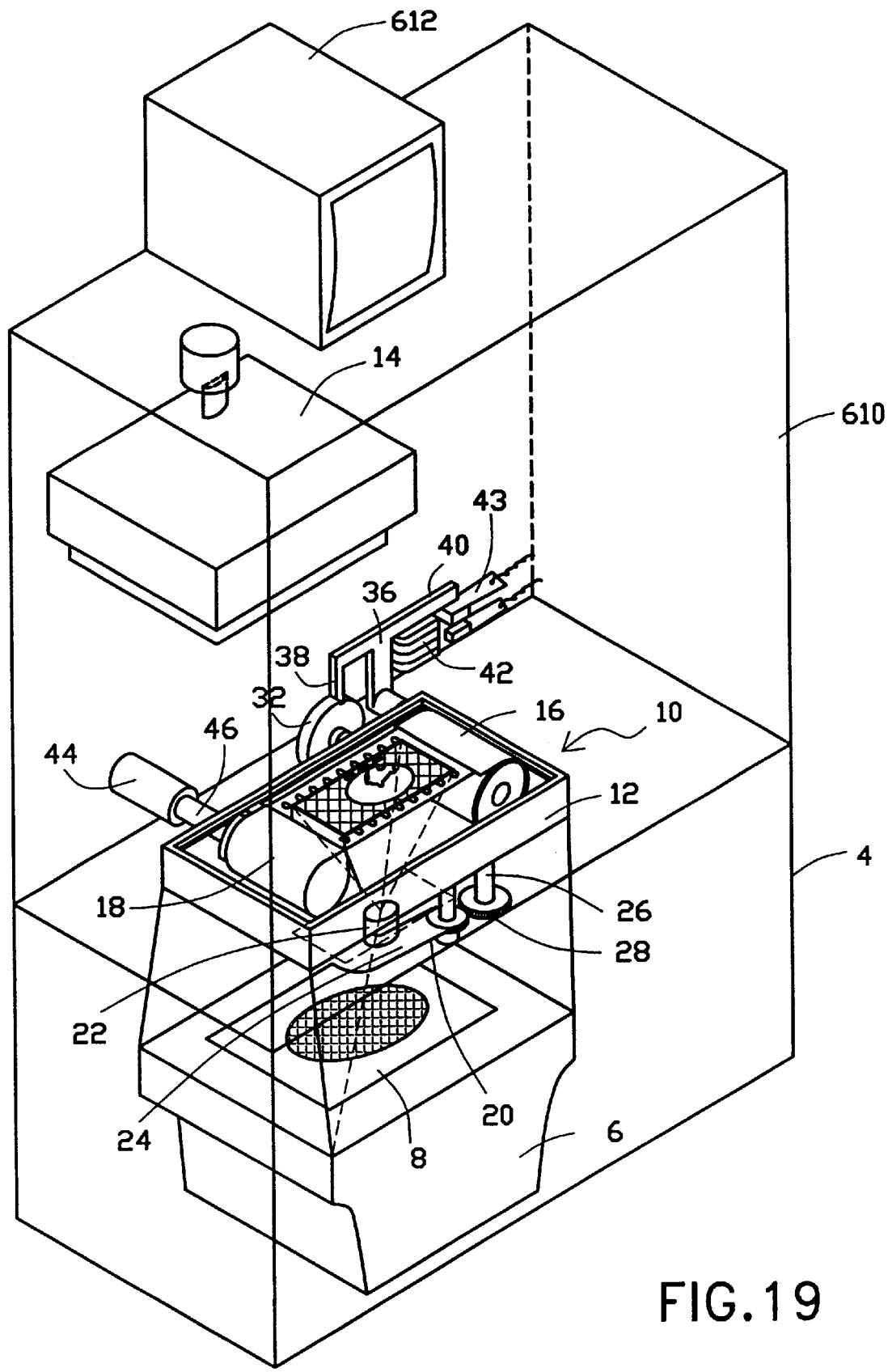
FIG. 19 shows an alternative film pre-exposure and loading apparatus.

With this form of container the entire apparatus may be enclosed in a light-tight enclosure for example as illustrated in FIG. 19. The enclosure 610 has an ultra-voilet illumination system with a monitor 612 allowing the operator to see what is happening inside the enclosure, whilst there are provided two access ports (not shown) provided with light-tight gloves whereby the operator can manipulate the apparatus from outside the enclosure 610. The film leading end is secured prior to winding to the split end of the tool 46. Then, with the lid 602 removed the tool end 46 having the film leading end attached thereto is pushed into the housing 604 , and the cover 14 fitted if desired. After pre-exposure and winding (which is carried out as described above), the winding tool 46 is retracted and the cap 602 fitted, rendering the container 600 light tight.

FIG. 17 shows an alternative form of film container. The film container 700 comprises a housing 702 which is formed as two housing shell halves 704 and 706. The shell halves 704, 706 co-operate to form an enclosure defining a circular aperture at one end, the opposed curved surfaces which define this aperture being indicated 708, 710. The shell halves 704, 706 also define an elongate slot between opposed ledges 712 and 714. The ledges 712, 714 are covered by strips 716 and 718 respectively of soft fabric or fabric-like material such as velvet, which may be secured by means of adhesive or double-sided tape to the ledges. One or both shell halves may be provided with lugs 720 having apertures or recesses which snap-fit with a corresponding protrusion on the opposite shell half, thereby securing the shell halves together.

With this container 702, the pre-exposure and winding method is generally as described above. However, on insertion of the container 702 into the apparatus 2 the lower shell half 706 is first fitted into the lower casing 12 beneath the tool end 46 once the film leading end is attached thereto, and the other shell half 706 secured thereto so that the tool 46 protrudes through the opening.

The upper casing part 14 may then be fitted, and the pre-exposure and winding operation carried out. The casing 14 is opened and the winding tool retracted, and still in the dark environment a plug 724 fitted into the aperture defined by the surfaces 708, 710. It is only once the plug is fitted that the loaded container 700 can be subjected to daylight.

An alternative form of a container can be seen in FIG. 18. The film container is generally similar to that of the previously described embodiment, but has no film-winding tool aperture. The container comprises a housing 802 which is formed of two housing shell halves 804, 806 which co-operate to form an enclosure defining an elongate film slot between opposed ledges 808, 810. The ledges 808, 810 are covered by strips 812, 814 of soft fabric or fabric-like material such as velvet which may be secured by means of adhesive or double-sided tape. One or both shell halves may be provided with one or more lugs 816 having apertures or recesses therein which snap-fit over protrusions 818 on the opposite shell half, to thereby secured the shell halves together. Alternatively, or additionally, adhesive or a welding technique may be used to secure the halves together.

With this container a generally similar pre-exposure and winding method is utilized, except that instead of winding the pre-exposed film into the container, the pre-exposed film is wound onto the tool end 46. Thus, the film leading end is secured to the tool end 46 and the cover 14 fitted. The film is then pre-exposed and wound into the tool end, and once the pre-exposure and winding is complete, still in the dark the cover 14 removed, and the pre-exposed film coil removed from the tool end, and placed in the lower shell half 804, with the upper shell half 806 fitted thereto, to render this light tight. FIG. 18 shows a pre-exposed coil of film from a bulk roll being fitted in the container. Thereafter, the trailing end 112 is secured to a conventional film patrone as described above.

What is claimed is:

1. A method of pre-exposing photographic film with latent images comprising the steps of:
   (a) providing a film container having a housing defining a film slot therein and a film-winding tool opening;
   (b) providing a roll of unexposed film;
   (c) securing a leading end of the film to a film-winding tool arranged on the opposite side of an exposure opening from said roll of unexposed film and enclosing the film leading end and winding tool end in the container with the tool extending from the film-winding tool opening;
   (d) enclosing the film container and roll of film in a light-tight enclosure;
   (e) sequentially exposing the film to a series of images directed onto the film, and advancing the film by rotating the film-winding tool between each exposure;
   (f) withdrawing the film-winding tool from the container and closing said opening therein; and
   (g) opening the enclosure and removing the film container having the pre-exposed film loaded therein.

2. A method according to claim 1 wherein the film container has a housing having an open end closed by an end cover which defines therein an opening closed by a resiliently biased shutter plate, at step (f) the shutter plate closing the said opening on removal of the film-winding tool.

3. A method according to claim 1 wherein the roll of unexposed film is provided wound in a further film container.

4. A method according to claim 3 wherein the further film container is a conventional film patrone.

5. A method according to claim 1 wherein the roll of unexposed film is a bulk roll of film, and wherein the method further involves prior to step (g), cutting the wound pre-exposed film from the bulk roll, and after step (g), securing the cut end to a further film container.

6. A method according to claim 5 wherein the further film container is a conventional film patrone having a central spool, the cut end being secured to the spool.

7. A method according to claim 1 wherein at step (c) the film-winding tool end is inserted through the opening of the end cover with the end cover detached from the housing and the shutter open, and thereafter the film end is secured to the film-winding tool, followed by securing the housing to the end cover.

8. A method according to claim 1 further comprising the step of cutting a film alignment notch into an edge of the film.

9. A method according to claim 1 wherein the advance of the film is detected by sensing means adapted to stop the film advance and output a signal communicated to said film exposure means after the advance of the film through a distance corresponding to one film frame.

10. An apparatus for pre-exposing film with latent images and winding into a film container for subsequent use in a camera comprising:
    means for enclosing a roll of unexposed film;
    means for enclosing a film container adapted to receive pre-exposed film;
    image generating means for generating a predetermined image to be exposed onto the film; and
    a film-winding tool extending into said means for enclosing the film container for sequentially winding said film into a film container after each subsequental exposure of a latent image.

11. An apparatus according to claim 10 wherein the film-winding tool is retractable whereby it can be at least partly withdrawn from the means for enclosing the film container.

12. An apparatus according to claim 10 wherein the means for enclosing the roll of unexposed film, and the means for enclosing the film container comprise a light-tight housing defining an aperture through which said film-winding tool extends.

13. An apparatus according to claim 10 comprising sensing means arranged to detect the passage of the film, the sensing means being operatively connected to control means, which control means are operatively connected to the film-winding tool.

14. An apparatus according to claim 13 where the control means comprise a computer programmed to control the film-winding tool and the image generating means.

15. An apparatus according to claim 13 wherein the sensing means comprises a sprocket wheel for contacting the film, connected to a sensing wheel having a slot cut therein and arranged to rotate by one revolution for every single frame which is advanced.

16. An apparatus according to claim 15 wherein a rocker is provided adjacent the sensing wheel, a first arm of the rocker abutting the periphery of the sensing wheel, and a second arm engaging a relay switch, whereby a stop signal is generated when the first arm engages in the slot.

17. An apparatus according to claim 13 wherein the sensor comprises an infra-red sensor adapted to detect the passage of film sprocket holes.

18. An apparatus according to claim 13 further comprising a film cutting punch to sever the pre-exposed film from the remaining exposed film.

19. An apparatus according to claim 13 further comprising a notch-cutting punch to cut an alignment notch in the periphery of the film.

20. An apparatus according to claim 10 in combination with the film container comprising a housing and an end cover defining an aperture therein which is closed by a movable shutter plate.

21. An apparatus according to claim 20 further in combination with a conventional film patrone containing a roll of unexposed film.

22. An apparatus according to claim 20 further in combination with a bulk roll of unexposed film.

23. A method of pre-exposing photographic film with latent images comprising the steps of:
  (a) providing a film container having a housing defining a film slot therein;
  (b) providing a roll of unexposed film;
  (c) securing a leading end of the film to a film-winding tool arranged on the opposite side of an exposure opening from said roll of unexposed film;
  (d) enclosing the film-winding tool end having the leading end of film attached thereto and the roll of film in a dark environment;
  (e) sequentially exposing the film to a series of images directed onto the film, and advancing the film by rotating the film-winding tool between each exposure;
  (f) removing the wound coil of film bearing latent images thereon from the film-winding tool and enclosing this in the film container.

24. A method according to claim 23 wherein the film container comprises a housing formed of two halves which co-operate to form a light-tight container having a film exit slot, wherein at step (f) the coil is placed between the halves which are secured together to enclose the coil of film therebetween with the film extending through the film exit slot.

25. A method of pre-exposing photographic film with latent images comprising the steps of:
  (a) providing a film container having a housing defining a film slot therein and which is open at one end, and defining a film-winding tool opening;
  (b) providing a roll of unexposed film;
  (c) securing a leading end of the film to a film-winding tool arranged on the opposite side of an exposure opening from said roll of unexposed film and enclosing the film leading end and winding tool end in the housing with the tool extending from the open end;
  (d) enclosing the housing and roll of film in a dark environment;
  (e) sequentially exposing the film to a series of images directed onto the film, and advancing the film by rotating the film-winding tool between each exposure;
  (f) withdrawing the film-winding tool from the housing and closing the said open end with an end cap.

26. An apparatus according to claim 10 in combination with the film container which has a film slot through which the pre-exposed film can be wound into the container.

27. An apparatus for pre-exposing film with latent images and winding into a film container for subsequent use in a camera comprising:
  means for enclosing a roll of unexposed film;
  means for enclosing a spooless film container which is formed with a film slot through which film can be wound;
  image generating means for generating a predetermined image to be exposed onto film; and
  a film winding tool extending into said means for enclosing the film container and adapted to directly engage an end of the film for sequentially winding said film into a film container after each sequential exposure of a latent image.

28. An apparatus for pre-exposing film with latent images and winding into a film container for subsequent use in a camera comprising:
  a first film container for receiving pre-expand film;
  a second film container containing unexposed film;
  means for enclosing said first and second film containers in a light tight manner;
  image generating means for generating a predetermined image to be exposed onto the film; and
  a film winding tool extending into said means for enclosing the film containers adapted to engage the film for sequentially winding said film out of the second film container into the first film container after each sequential exposure of a latent image.

29. An apparatus according to claim 28 wherein the first film container is a spooless film container, and said film winding tool is adapted to directly engage an end of the film within the first film container.

* * * * *

UNITED STATES PATENT AND TRADEMARK OFFICE
CERTIFICATE OF CORRECTION

PATENT NO.      : 6,535,696 B1
DATED           : March 18, 2003
INVENTOR(S)     : Yet Chan It is certified that error appears in the above-identified patent and that said Letters Patent is hereby corrected as shown below:

<u>Title page, Item [54] and Column 1, lines 1 and 2,</u>
Title should read -- FILM PRE-EXPOSURE APPARATUS AND METHOD --

Signed and Sealed this

Second Day of September, 2003

JAMES E. ROGAN
*Director of the United States Patent and Trademark Office*